United States Patent
Piao et al.

(10) Patent No.: US 12,080,889 B2
(45) Date of Patent: Sep. 3, 2024

(54) NEGATIVE ELECTRODE FOR LITHIUM SECONDARY BATTERY AND LITHIUM SECONDARY BATTERY COMPRISING THE SAME

(71) Applicant: LG CHEM, LTD., Seoul (KR)

(72) Inventors: Lilin Piao, Daejeon (KR); Je-Young Kim, Daejeon (KR); Sang-Wook Woo, Daejeon (KR); Hee-Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 821 days.

(21) Appl. No.: 17/256,451

(22) PCT Filed: Jan. 31, 2020

(86) PCT No.: PCT/KR2020/001546
§ 371 (c)(1),
(2) Date: Dec. 28, 2020

(87) PCT Pub. No.: WO2020/159322
PCT Pub. Date: Aug. 6, 2020

(65) Prior Publication Data
US 2021/0273223 A1 Sep. 2, 2021

(30) Foreign Application Priority Data
Feb. 1, 2019 (KR) .......................... 10-2019-0013772

(51) Int. Cl.
| | | |
|---|---|---|
| H01M 4/587 | (2010.01) | |
| H01M 4/04 | (2006.01) | |
| H01M 10/0525 | (2010.01) | |
| H01M 4/02 | (2006.01) | |

(52) U.S. Cl.
CPC ......... *H01M 4/587* (2013.01); *H01M 4/0404* (2013.01); *H01M 4/043* (2013.01); *H01M 10/0525* (2013.01); *H01M 2004/021* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | |
|---|---|---|
| 2004/0137328 A1 | 7/2004 | Kim et al. |
| 2009/0098448 A1 | 4/2009 | Ozaki et al. |
| 2011/0171532 A1 | 7/2011 | Okanishi et al. |
| 2013/0122369 A1 | 5/2013 | Kim et al. |
| 2014/0186702 A1* | 7/2014 | Takahata ............... H01M 4/364 429/211 |
| 2014/0227588 A1 | 8/2014 | Kim et al. |
| 2014/0356707 A1 | 12/2014 | Kwon et al. |
| 2016/0172675 A1* | 6/2016 | Ito ......................... H01M 4/366 429/223 |
| 2017/0200950 A1 | 7/2017 | Gulas et al. |
| 2017/0373315 A1 | 12/2017 | Lee et al. |
| 2018/0159118 A1* | 6/2018 | Lee ...................... H01M 4/133 |
| 2018/0261875 A1 | 9/2018 | Imaji et al. |
| 2021/0143425 A1* | 5/2021 | An ....................... H01M 4/587 |

FOREIGN PATENT DOCUMENTS

| | | |
|---|---|---|
| CN | 105794027 A | 5/2024 |
| JP | 3716818 B2 | 11/2005 |
| JP | 2010-238469 A | 10/2010 |
| JP | 2011-49071 A | 3/2011 |
| JP | 5407196 B2 | 2/2014 |
| KR | 10-2004-0057416 A | 7/2004 |
| KR | 10-2011-0033134 A | 3/2011 |
| KR | 10-1084847 B1 | 11/2011 |
| KR | 10-2014-0091088 A | 7/2014 |
| KR | 10-2014-0099987 A | 8/2014 |
| KR | 10-2016-0078752 A | 7/2016 |
| KR | 10-1702980 B1 | 2/2017 |
| KR | 10-2017-0031201 A | 3/2017 |
| KR | 10-2018-0000145 A | 1/2018 |
| KR | 10-2018-0044302 A | 5/2018 |

OTHER PUBLICATIONS

Machine translation of Korean Patent Publication No. 20140091088 (Year: 2014).*
International Search Report issued in PCT/KR2020/001546 (PCT/ISA/210), dated May 20, 2020.
European Patent Office Extended Search Report for Application No. 20749166.3 dated Jan. 11, 2022.

\* cited by examiner

*Primary Examiner* — Wyatt P McConnell
(74) *Attorney, Agent, or Firm* — Birch, Stewart, Kolasch & Birch, LLP

(57) ABSTRACT

A negative electrode for a lithium secondary battery including a negative electrode active material layer. The negative electrode active material layer is formed by steps of coating a negative electrode mixture slurry including spheroidized natural graphite particles as a negative electrode active material on at least one surface of a negative electrode current collector, followed by drying and pressing the negative electrode mixture slurry on the at least one surface of the negative electrode current collector. The spheroidized natural graphite particles include a plurality of pores. The negative electrode active material layer has a Brunauer-Emmett-Teller (BET) specific surface area of the negative electrode active material layer after the pressing is larger than a BET specific surface area of the negative electrode active material layer before pressing. A difference in the BET specific surface area before and after pressing ranges from 0.9 $m^2/g$ to 1.2 $m^2/g$.

10 Claims, No Drawings

NEGATIVE ELECTRODE FOR LITHIUM SECONDARY BATTERY AND LITHIUM SECONDARY BATTERY COMPRISING THE SAME

TECHNICAL FIELD

The present disclosure relates to a negative electrode for a lithium secondary battery and a lithium secondary battery comprising the same.

The present application claims the benefit of Korean Patent Application No. 10-2019-0013772 filed on Feb. 1, 2019 with the Korean Intellectual Property Office, the disclosure of which is incorporated herein by reference in its entirety.

BACKGROUND ART

Recently, with the rapid and widespread use of electronic devices using batteries such as mobile phones, laptop computers and electric vehicles, there is the growing demand for secondary batteries of smaller size, lighter weight and higher capacity. In particular, lithium secondary batteries receive much attention as a source of power for portable devices due to their lightweight and high energy density advantages. In this circumstance, many research and development efforts have been made to improve the performance of lithium secondary batteries.

Currently, negative electrode active materials of lithium secondary batteries primarily include natural graphite and artificial graphite made available on the market. In particular, when compared to artificial graphite, the natural graphite negative electrode active material is known for having higher adhesion strength, higher capacity, higher rolling property and superior price competitiveness. Despite these advantages of the natural graphite negative electrode active material, it is known that natural graphite has poorer long-term durability and expansion performance than artificial graphite due to large volume expansion/shrinkage during charging/discharging. Accordingly, the industry has attempted to combine natural graphite with artificial graphite rather than natural graphite alone for the negative electrode active material, but also in this case, there is still the volume expansion/shrinkage problem of natural graphite during charging/discharging of lithium secondary batteries.

To solve the side reaction problem between the natural graphite negative electrode active material and the electrolyte solution, suggestions have been made on approach to improve the life characteristics of natural graphite by spheroidizing natural graphite and coating pitch or polymer resin on the surface of the natural graphite particles to form a carbon layer through thermal treatment. However, the carbon layer of pitch or polymer resin is not formed in the pores of the particles of the natural graphite negative electrode active material manufactured as described above, resulting in a high specific surface area of natural graphite and the exposure of natural graphite to the electrolyte solution, and as a result, causing side reactions with the electrolyte solution.

DISCLOSURE

Technical Problem

To solve the above-described problem, the present disclosure is directed to providing a negative electrode for a lithium secondary battery comprising a spheroidized natural graphite negative electrode active material free of expansion/shrinkage during charging/discharging.

Additionally, the present disclosure is directed to providing a negative electrode for a lithium secondary battery comprising the spheroidized natural graphite negative electrode active material that does not cause side reactions with an electrolyte solution during charging/discharging of the lithium secondary battery.

The present disclosure is further directed to providing a lithium secondary battery comprising the negative electrode for a lithium secondary battery.

The present disclosure is further directed to providing a method for manufacturing the negative electrode for a lithium secondary battery.

Technical Solution

According to a first embodiment of the present disclosure, there is provided a negative electrode for a lithium secondary battery comprising a negative electrode active material layer, wherein the negative electrode active material layer is formed by steps of coating a negative electrode mixture slurry including spheroidized natural graphite particles as a negative electrode active material on at least one surface of a negative electrode current collector, followed by drying and pressing the negative electrode mixture slurry on the at least one surface of the negative electrode current collector, and the spheroidized natural graphite particles include a plurality of pores wherein pitch is present in the plurality of pores, and wherein the negative electrode active material layer has a Brunauer-Emmett-Teller (BET) specific surface area of the negative electrode active material layer after the pressing that is larger than a BET specific surface area of the negative electrode active material layer before the pressing, wherein a difference in the BET specific surface area before and after pressing ranges from 0.9 m$^2$/g to 1.2 m$^2$/g.

According to a second embodiment of the present disclosure, in the first embodiment, there is provided the negative electrode for a lithium secondary battery wherein the negative electrode active material layer after pressing has the BET specific surface area that is larger than the BET specific surface area before pressing, wherein the difference in the BET specific surface area before and after pressing ranges from 0.9 m$^2$/g to 1.1 m$^2$/g.

According to a third embodiment of the present disclosure, in the first or second embodiment, there is provided the negative electrode for a lithium secondary battery wherein the negative electrode active material comprises of the spheroidized natural graphite including the plurality of pores into which the pitch inserted.

According to a fourth embodiment of the present disclosure, in any one of the first to third embodiments, there is provided the negative electrode for a lithium secondary battery wherein the negative electrode active material layer after pressing has the BET specific surface area ranges from 3.3 m$^2$/g to 3.8 m$^2$/g.

According to a fifth embodiment of the present disclosure, in any one of the first to fourth embodiments, there is provided the negative electrode for a lithium secondary battery wherein the negative electrode active material layer after pressing has a total pore volume that is larger than a total pore volume of the negative electrode active material layer before pressing, wherein a difference in the total pore volume before and after pressing ranges from 8×10$^{-3}$ cm$^3$/g to 9×10$^{-3}$ cm$^3$/g.

According to a sixth embodiment of the present disclosure, in any one of the first to fifth embodiments, there is provided the negative electrode for a lithium secondary battery wherein the negative electrode has degree of orientation of an $I_{004}/I_{110}$ value of 14 to 23 after pressing.

According to a seventh embodiment of the present disclosure, there is provided a lithium secondary battery comprising the negative electrode for a lithium secondary battery defined in any one of the first to sixth embodiments.

According to an eighth embodiment of the present disclosure, there is provided a method for manufacturing the negative electrode for a lithium secondary battery defined in the first embodiment comprising (S1) coating spheroidized natural graphite with pitch, (S2) forming a negative electrode active material layer including the spheroidized natural graphite as a negative electrode active material on at least one surface of an electrode current collector, and (S3) pressing the negative electrode active material layer obtained in (S2) by a press roll at a temperature ranging between 23° C. to 25° C. to obtain the negative electrode active material layer, wherein a Brunauer-Emmett-Teller (BET) specific surface area of the negative electrode active material layer after pressing is larger than the BET specific surface area of the negative electrode active material layer before pressing, and a difference in the BET specific surface area before and after pressing ranges from 0.9 m²/g to 1.2 m²/g.

According to a ninth embodiment of the present disclosure, in the eighth embodiment, there is provided the method for manufacturing wherein in (S2), the BET specific surface area of the negative electrode active material layer before pressing is 2.4 m²/g to 2.6 m²/g.

According to a tenth embodiment of the present disclosure, in the eighth or ninth embodiment, there is provided the method for manufacturing wherein in the (S2), the negative electrode active material layer before pressing has a total pore volume ranging from $20\times10^{-3}$ cm³/g to $30\times10^{-3}$ cm³/g.

According to an eleventh embodiment of the present disclosure, in any one of the eighth to tenth embodiments, there is provided the method for manufacturing wherein (S3) comprises a step of pressing the negative electrode active material layer obtained in (S2) by the press roll at the temperature ranging between 23° C. to 25° C. to obtain the negative electrode active material layer wherein a total pore volume of the negative electrode active material layer after pressing is larger than a total pore volume of the negative electrode active material layer before pressing, and a difference in the total pore volume before and after pressing ranges from $8\times10^{-3}$ cm³/g to $9\times10^{-3}$ cm³/g.

According to a twelfth embodiment of the present disclosure, in any one of the eighth to eleventh embodiments, there is provided the method for manufacturing wherein in (S3), the BET specific surface area of the negative electrode active material layer after pressing is 3.3 m²/g to 3.8 m²/g.

Advantageous Effects

The negative electrode for a lithium secondary battery according to the present disclosure uses, as an active material, spheroidized natural graphite active material particles which have a plurality of pores into which pitch is inserted to fill up the void spaces of the pores, thereby reducing side reactions between the active material and the electrolyte solution during charging/discharging. As a result, it is possible to suppress solid electrolyte interphase (SEI) growth that occurs due to the side reactions.

Additionally, the negative electrode for a lithium secondary battery according to the present disclosure uses, as the negative electrode active material, spheroidized natural graphite active material particles having a plurality of pores into which pitch is inserted to fill up the void spaces of the pores, thereby reducing changes in the total pore volume of the negative electrode before and after pressing of the negative electrode and changes in the BET specific surface area of the negative electrode, and ultimately solving the problem with volume expansion/shrinkage of the spheroidized natural graphite negative electrode active material during charging/discharging of the lithium secondary battery.

Furthermore, the negative electrode for a lithium secondary battery according to the present disclosure has low degree of orientation of the pressed electrode and improved expansion performance.

BEST MODE

These and other advantages and features of the present disclosure and methods for achieving them will be apparent by referring to the embodiments described in detail below. However, the present disclosure is not limited to the following disclosed embodiments and will be embodied in many different forms, and these embodiments are provided to make the disclosure complete and explain the scope of the present disclosure fully to those having ordinary skill in the technical field pertaining to the present disclosure, and the present disclosure is only defined by the scope of the appended claims.

Hereinafter, the present disclosure will be described in more detail.

According to the present disclosure, there is provided a negative electrode for a lithium secondary battery including a negative electrode active material layer, wherein the negative electrode active material layer is formed by coating a negative electrode mixture slurry including spheroidized natural graphite as a negative electrode active material on at least one surface of a negative electrode current collector, followed by drying and pressing, the spheroidized natural graphite includes a plurality of pores into which pitch is inserted, and the negative electrode active material layer has (Brunauer-Emmett-Teller (BET) specific surface area of the negative electrode active material layer after pressing)–(BET specific surface area of the negative electrode active material layer before pressing) of 0.9 to 1.2 m²/g.

The BET specific surface area refers to the surface area of a powder or bulk measured through an amount of nitrogen gas physically adsorbed to the entire surface of the powder or bulk to measure the specific surface area of the powder or bulk.

According to an embodiment of the present disclosure, the measurement method of the BET specific surface area is as follows.

First, the completely dried negative electrode active material layer is cut to 8 mm×8 mm size to prepare 30 samples. In this instance, the negative electrode active material layer may be about 80 µm in thickness, and may have the controlled to loading amount of 3.6 mAh/cm². The sampled negative electrode active material layer is put into a standard sample cell (glass) and dried in a vacuum condition at 130° C. for 2 hours. To measure in a liquid nitrogen container of 77 K, the liquid nitrogen container is filled with liquid nitrogen. The standard cell is cooled down, and to measure in the liquid nitrogen condition, the standard sample cell is fixed to a measurement instrument (BEL Japan, BELSORP-mino II). Subsequently, the measurement program works to measure the BET specific surface area through adsorption/desorption on the surface of the sampled electrode in the nitrogen gas environment. When measuring the BET specific surface area, the total pore volume may be measured together.

In the negative electrode active material layer, (BET specific surface area of the negative electrode active material layer after pressing)–(BET specific surface area of the negative electrode active material layer before pressing), i.e., a difference in the BET specific surface area of the negative electrode active material layer before and after pressing is 0.9 to 1.2 m$^2$/g, and according to an embodiment of the present disclosure, the difference in the BET specific surface area may be 0.9 to 1.1 m$^2$/g, or 0.9 to 1.0 m$^2$/g.

When the range of differences in the BET specific surface area of the negative electrode active material layer before and after pressing is less than 0.9 m$^2$/g, excess pitch is coated on the negative electrode active material layer surface, resulting in reduced capacity and energy density of the lithium secondary battery using the negative electrode active material layer, and when the range of differences in the BET specific surface area of the negative electrode active material layer before and after pressing exceeds 1.2 m$^2$/g, there are many pores in the negative electrode active material layer, side reactions noticeably increase between the electrolyte solution and the negative electrode active material in the pores, swelling of the negative electrode drastically increases, the cycle life of the lithium secondary battery using the negative electrode active material layer reduces, and the battery degrades.

According to an embodiment of the present disclosure, the negative electrode active material of the negative electrode mixture slurry may include spheroidized natural graphite, preferably, substantially comprise of spheroidized natural graphite, and more preferably, comprise of spheroidized natural graphite alone.

In the present disclosure, the "spheroidized natural graphite" refers to natural graphite having a nearly spherical shape, and not all natural graphite particles are controlled to a perfect spherical shape.

According to an embodiment of the present disclosure, the spheroidized carbon-based negative electrode active material may have circularity of 0.82 to 0.98, or 0.88 to 0.92.

The circularity may be a value obtained by dividing the perimeter of a circle of the same area as a projected image of the negative electrode active material by the perimeter of the projected image, and in detail, the circularity may be given as the following Equation 1. The circularity may be measured using a particle shape analyzer, for example, Malvern sysmex FPIA3000.

Circularity=Perimeter of a circle of the same area as a projected image of the active material/Perimeter of the projected image  [Equation 1]

The spheroidized natural graphite manufactured as described above may have the average particle size (D50) of 10 μm to 25 μm, or 12 μm to 20 μm, or 12 μm to 16 μm by rounding off the edges, but is not limited thereto.

When the average particle size (D50) of the spheroidized natural graphite is less than 10 μm, the capacity may be low and the rolling property may be reduced. Additionally, when the average particle size (D50) of the spheroidized natural graphite exceeds 25 μm, Li ion deintercalation and intercalation may be reduced due to increasing average particle size of the negative electrode active material particles.

The average particle size may be measured, for example, using a laser diffraction method or a scanning electron microscope (SEM) image, but the present disclosure is not limited thereto. The laser diffraction method can generally measure the particle size from the submicron range to a few mm, and can obtain results with high reproducibility and high resolution. In detail, after a target powder is dispersed in a dispersion medium and introduced into a commercially available laser diffraction particle size measurement instrument (for example, Microtrac S3500), the particle size distribution may be calculated by measuring differences in diffraction pattern with respect to the particle size when particles pass through a laser beam. In this instance, the minimum particle size (Dmin) may be measured by calculating the particle diameter at the minimum particle size point in the cumulative particle number distribution according to particle size in the measurement instrument, and the average particle size (D50) may be measured by calculating the particle diameter at 50% point in the cumulative particle number distribution.

The spheroidized natural graphite according to the present disclosure is characterized in that there is a plurality of pores inside and outside of the natural graphite particles, and the pores are filled with pitch.

The negative electrode for a lithium secondary battery according to an embodiment of the present disclosure may be manufactured by a common method widely used in the technical field pertaining to the present disclosure using the spheroidized natural graphite as the negative electrode active material. Preferably, the negative electrode for a lithium secondary battery according to an embodiment of the present disclosure may be manufactured by a common method known in the technical field pertaining to the present disclosure using only the spheroidized natural graphite as the negative electrode active material. By way of non-limiting example, in an embodiment of the present disclosure, the negative electrode active material layer may be formed by mixing the negative electrode active material including the spheroidized natural graphite with a binder, a conductive material and a solvent etc., and stirring them to prepare a negative electrode mixture, and coating the negative electrode mixture on at least one surface of the negative electrode current collector, followed by drying and pressing.

In an embodiment of the present disclosure, in addition to the spheroidized natural graphite of the present disclosure, the negative electrode active material may include at least one of lithium containing titanium composite oxide (LTO), (semi)metals (Me) including Si, Sn, Li, Zn, Mg, Cd, Ce, Ni or Fe; alloys of the (semi)metals (Me); oxide of the (semi)metals (Me); composite of the (semi)metals (Me) and carbon on the level of impurities.

The negative electrode active material may be present in an amount of 80 weight % to 99 weight % based on the total weight of the negative electrode mixture.

The negative electrode current collector may be generally 3 μm to 500 μm thick. The negative electrode current collector is not limited to any particular type if it has high conductivity while not causing a chemical reaction to the corresponding battery, and may include, for example, copper, stainless steel, aluminum, nickel, titanium, sintered carbon, copper or stainless steel treated with carbon, nickel, titanium and silver etc. on the surface, and aluminum-cadmium alloys etc. Additionally, in the same way as a positive electrode current collector described below, the negative electrode current collector may have fine surface texture to enhance the bond strength of the negative electrode active material, and may be used in a variety of forms, for example, a film, a sheet, a foil, a net, a porous body, a foam and a nonwoven.

The binder is a substance that aids in binding the conductive material, the active material and the current collector together, and may be generally present in an amount of 1 to 20 weight % based on the total weight of the negative electrode mixture.

Non-limiting examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated-EPDM, styrene-butadiene rubber, fluorine rubber and a variety of copolymers.

The conductive material is a substance for improving the conductivity of the negative electrode active material, and may be present in an amount of 1 to 20 weight % based on the total weight of the negative electrode mixture.

The conductive material is not limited to any particular type if it has conductivity while not causing a chemical reaction to the corresponding battery, and may include, for example, a carbon-based material such as carbon black (Super P), acetylene black, ketjen black, channel black, furnace black, lamp black, thermal black; a conductive fiber such as a carbon fiber or a metal fiber; fluorocarbon; metal powder such as aluminum, nickel powder; conductive whiskers such as zinc oxide, potassium titanate; conductive metal oxide such as titanium oxide; a conductive material such as a polyphenylene derivative.

The solvent may include an organic solvent such as water or N-methyl-2-pyrrolidone (NMP), and when the negative electrode mixture includes the negative electrode active material, and optionally includes the binder and the conductive material, the solvent may be present in an appropriate amount for a desirable viscosity. For example, the solvent may be present in such an amount that the concentration of solids including the negative electrode active material, and optionally including the binder and the conductive material is 40 weight % to 70 weight %, preferably 45 weight % to 55 weight %.

According to an embodiment of the present disclosure, the negative electrode active material layer formed after pressing may have the BET specific surface area ranging from 3.3 to 3.8 $m^2/g$. When the BET specific surface area of the negative electrode active material layer satisfies the range of 3.3 $m^2/g$ to 3.8 $m^2/g$, pitch may be uniformly coated in the pores inside and outside of the negative electrode active material layer and on the surface of the negative electrode active material layer, and it is possible to prevent a reduction in capacity of the lithium secondary battery using the negative electrode active material layer due to the coating of excess pitch on the surface of the negative electrode active material layer.

According to an embodiment of the present disclosure, the negative electrode active material layer after pressing may have the total pore volume that is lower by $8\times10^{-3}$ $cm^3/g$ to $9\times10^{-3}$ $cm^3/g$ than the total pore volume of the negative electrode active material layer immediately before pressing. When a difference in total pore volume of the negative electrode active material layer satisfies the range of $8\times10^{-3}$ $cm^3/g$ to $9\times10^{-3}$ $cm^3/g$, it is possible to avoid an increase in process cost more than necessary for elaborate coating to make a difference in the pore volume as above, and prevent the expansion performance degradation of the negative electrode after charge/discharge cycles due to the side reaction between the negative electrode active material layer and the electrolyte solution.

The negative electrode including the spheroidized natural graphite according to the present disclosure has a low degree of orientation value, and its expansion performance is improved.

The degree of orientation of the negative electrode may be generally measured by X-ray diffraction (XRD) after pressing the manufactured negative electrode to a predetermined electrode density, and the result value may be expressed as 1004/1110 indicating a ratio of 004 peak and 110 peak.

That is, the degree of orientation (I004/I110) of the negative electrode is a peak intensity ratio (I004/I110) of the (004) plane and the (110) plane by X-ray diffraction analysis in the electrode, and the peak intensity ratio may be obtained through X-ray diffraction analysis, and the X-ray diffraction analysis in the electrode refers to X-ray diffraction analysis performed on an electrode (a negative electrode) into which the composite particles are manufactured. The X-ray diffraction analysis may be measured using Cu-Kα radiation by using an X-ray diffraction analyzer Bruker D4 Endeavor, and numerical corrections may be performed through Topas3 fitting program.

The smaller the $I_{004}/I_{110}$ value, the better the isotropic property, and as the negative electrode does not swell in one direction and swells in many directions, the swelling ratio decreases, and thus it may be interpreted that the expansion performance is improved. As the $I_{004}/I_{110}$ value is higher, the negative electrode swells in only one direction along the Y-axis, and the swelling ratio increases, which is more disadvantageous for expansion performance improvement.

The $I_{004}/I_{110}$ value indicating the degree of orientation of a negative electrode including general natural graphite is about 40. In contrast, in the negative electrode including only the spheroidized natural graphite of the present disclosure as the negative electrode active material, the voids in the spheroidized natural graphite are filled with pitch and the spheroidized natural graphite has carbon coating with pitch on the surface, thereby reducing the specific surface area on the whole and improving the isotropic property of the electrode, and the negative electrode has the $I_{004}/I_{110}$ degree of orientation value of 14 to 23 or 16 to 22 or about 16, and the degree of orientation value of the negative electrode is much lower than the existing one.

In the present disclosure, the total pore volume of the negative electrode active material layer may be obtained using the machine used when measuring the BET specific surface area under the same measurement condition and by the same method.

According to another embodiment of the present disclosure, there is provided a method for manufacturing a negative electrode for a lithium secondary battery, comprising:

(S1) coating spheroidized natural graphite with pitch;

(S2) forming a negative electrode active material layer including the spheroidized natural graphite as a negative electrode active material on at least one surface of an electrode current collector, such that the BET specific surface area of the negative electrode active material layer before pressing is 2.4 to 2.6 $m^2/g$; and (S3) pressing the negative electrode active material layer obtained in the step (S2) by a press roll at the temperature of 23° C. to 25° C., to obtain the negative electrode active material layer such that the BET specific surface area of the negative electrode active material layer after pressing is larger than the BET specific surface area of the negative electrode active material layer before pressing, and a difference in the BET specific surface area before and after pressing ranges from 0.9 $m^2/g$ to 1.2 $m^2/g$.

In the step (S1), the "spheroidized natural graphite" according to the present disclosure may be manufactured as below. First, a raw graphite ore is processed into small particles by mechanical treatment. Strong base solution treatment and strong acid solution treatment are performed at high temperature to remove impurities. After washing and drying at high temperature, mesh sieving is performed to mine platy natural graphite. To turn the platy natural graphite into a spherical shape, primary grinding and secondary grinding, i.e., a mechanical process is performed. Subsequently, after acid treatment, washing and drying, purification is performed to obtain high purity spherical natural graphite. Defects occur to the surface of the obtained spherical natural graphite during mechanical pulverization and milling, and a chemical reactive group is formed after strong base/strong acid cleaning. During spheroidization, defects occur in the natural graphite due to the mechanical process. By this reason, spherical natural graphite is obtained through carbon coating by carbonizing pitch on the high purity solid phase natural graphite surface at 1100 to 1500° C., followed by disintegration, sieving and de-ironing. In particular, according to an embodiment of the present disclosure, to fill the pores inside and outside of the natural graphite with pitch, the spherical natural graphite is put in a container, and a coating agent is added, and high temperature heating is performed in an air tight condition to fill up the voids in the active material particles. The coating agent mainly includes pitch, but when the coating agent only includes pitch, the finally produced negative electrode active material particles may be too stiff and hard. To reduce the hardness, an aid may be additionally used. The actual carbon ratio after carbon coating may be 3 to 10 weight %, or 4 to 10 weight %.

In this instance, the actual carbon ratio may be calculated by the following Equation.

Actual carbon ratio (weight %)=[{(Weight of finally obtained negative electrode active material)−(Weight of natural graphite particles before pitch insertion)}/(Weight of finally obtained negative electrode active material)]×100

The actual carbon ratio is an amount of pitch inserted into the spheroidized natural graphite particles which are the final negative electrode active material.

In this instance, the pitch used as the coating agent may have the average particle size of about 3 to 5 μm. Additionally, an amount of the pitch used may be twice or more greater than the actual carbon ratio after carbon coating.

In the step (S2), the negative electrode active material layer including the spheroidized natural graphite as the negative electrode active material is formed on at least one surface of the electrode current collector.

According to an embodiment of the present disclosure, the negative electrode active material layer before pressing may have porosity of 40 to 55%. Additionally, the negative electrode active material layer before pressing may have the total pore volume ranging from $20\times10^{-3}$ $cm^3/g$ to $30\times10^{-3}$ $cm^3/g$ or from $24\times10^{-3}$ $cm^3/g$ to $27\times10^{-3}$ $cm^3/g$.

In the step (S3), the negative electrode active material layer after pressing may have the BET specific surface area ranging from 3.3 $m^2/g$ to 3.8 $m^2/g$, or from 3.4 $m^2/g$ to 3.7 $m^2/g$. According to an embodiment of the present disclosure, the negative electrode active material layer may have (Total pore volume of the negative electrode active material layer after pressing)−(Total pore volume of the negative electrode active material layer before pressing) of $8\times10^{-3}$ $cm^3/g$ to $9\times10^{-3}$ $cm^3/g$, and the negative electrode active material layer after pressing may have porosity of 15 to 35%, or 20 to 33%, or 20 to 32%, or 20 to 28%, or 27 to 32%, 28 to 29%.

According to an embodiment of the present disclosure, the dried negative electrode active material layer may be pressed by a roll press at least once. The temperature of the used roll press may range, for example, between 23° C. and 25° C., and the negative electrode active material layer may be pressed by the roll press. The roll press may be a tandem press, and for example, the negative electrode active material layer may be pressed using a tandem press (THANK-METAL, a mini precision roll press) with the adjusted gap between 30 and 65. Additionally, in an embodiment of the present disclosure, the pressing condition may be controlled such that the negative electrode active material layer after pressing has the pressing density of 1.5 to 1.6 g/cc and porosity of 15 to 35%, or 20 to 33%, or 20 to 32%, or 20 to 28%, or 27 to 32%, 28 to 29%.

Additionally, an embodiment of the present disclosure provides a lithium secondary battery.

In detail, the lithium secondary battery of the present disclosure may be manufactured by injecting a non-aqueous electrolyte solution of the present disclosure into an electrode structure including a positive electrode, a negative electrode and a separator interposed between the positive electrode and the negative electrode. In this instance, the positive electrode, the negative electrode and the separator that make up the electrode structure may include those commonly used to manufacture lithium secondary batteries.

In this instance, the positive electrode may be manufactured by coating a positive electrode mixture including a positive electrode active material, a binder, a conductive material and a solvent on a positive electrode current collector.

The positive electrode current collector is not limited to any particular type if it has conductivity while not causing a chemical reaction to the corresponding battery, and may include, for example, stainless steel, aluminum, nickel, titanium, sintered carbon, or aluminum or stainless steel treated with carbon, nickel, titanium, silver on the surface.

The positive electrode active material is a compound capable of reversible intercalation and deintercalation of lithium, and in detail, the positive electrode active material may include, for example, lithium composite metal oxide including lithium and at least one type of metal of cobalt, manganese, nickel and aluminum. In more detail, the lithium composite metal oxide may include at least one of lithium-manganese-based oxide (for example, $LiMnO_2$, $LiMn_2O_4$), lithium-cobalt-based oxide (for example, $LiCoO_2$), lithium-nickel-based oxide (for example, $LiNiO_2$), lithium-nickel-manganese-based oxide (for example, $LiNi_{1-Y}Mn_YO_2$ (0<Y<1), $LiMn_{2-z}Ni_zO_4$(0<Z<2)), lithium-nickel-cobalt-based oxide (for example, $LiNi_{1-Y1}Co_{Y1}O_2$ (0<Y1<1)), lithium-manganese-cobalt-based oxide (for example, $LiCo_{1-Y2}Mn_{Y2}O_2$ (0<Y2<1), $LiMn_{2-z1}Co_{z1}O_4$ (0<Z1<2)), lithium-nickel-manganese-cobalt-based oxide (for example, $Li(Ni_pCo_qMn_{r1})O_2$ (0<p<1, 0<q<1, 0<r1<1, p+q+r1=1) or $Li(Ni_{p1}Co_{q1}M_{r2})O_4$ (0<p1<2, 0<q1<2, 0<r2<2, p1+q1+r2=2)), or lithium-nickel-cobalt-transition metal (M) oxide (for example, $Li(Ni_{p2}CO_{q2}Mn_{r3}M_{s2})O_2$ (M is selected from the group consisting of Al, Fe, V, Cr, Ti, Ta, Mg and Mo, and p2, q2, r3 and s2 are each independently the atomic fractions of the elements, 0<p2<1, 0<q2<1, 0<r3<1, 0<s2<1, p2+q2+r3+s2=1). Among them, due to the ability to increase the capacity and stability of the battery, the lithium composite metal oxide may be $LiCoO_2$, $LiMnO_2$, $LiNiO_2$, lithium nickel manganese cobalt oxide (for example, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$), or lithium nickel cobalt aluminum oxide (for example, $LiNi_{0.8}Co_{0.15}Al_{0.05}O_2$), and when considering the remarkable improvement effect benefited from controlling the type and amount of the constituent elements of the lithium composite metal oxide, the lithium composite metal oxide may be at least one of $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$.

The positive electrode active material may be present in an amount of 80 weight % to 99 weight % based on the total weight of each of the positive electrode mixture.

The binder is a substance that aids in binding the active material with the conductive material and binding to the current collector, and is generally present in an amount of 1 to 30 weight % based on the total weight of the positive electrode mixture. Examples of the binder may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene ter polymer (EPDM), sulfonated EPDM, styrene-butadiene rubber, fluorine rubber and a variety of copolymers.

The conductive material is generally present in an amount of 1 to 30 weight % based on the total weight of the positive electrode mixture.

The conductive material is not limited to any particular type if it has conductivity while not causing a chemical reaction to the corresponding battery, and may include, for example, graphite; a carbon-based material such as carbon black, acetylene black, ketjen black, channel black, furnace black, lamp black, thermal black; a conductive fiber such as a carbon fiber or a metal fiber; fluorocarbon; metal powder such as, aluminum, nickel powder; conductive whiskers such as zinc oxide, potassium titanate; conductive metal oxide such as titanium oxide; a conductive material such as a polyphenylene derivative. Specific examples of the conductive material on the market may include acetylene black-based products (Chevron Chemical Company) or denka black (Denka Singapore Private Limited), products from Gulf Oil Company, Ketjen black, EC-based products (Armak Company), Vulcan XC-72 (Cabot Company) and Super P (Timcal).

The solvent may include an organic solvent such as N-methyl-2-pyrrolidone (NMP), and when the positive electrode mixture includes the positive electrode active material, and optionally includes the binder and the conductive material, the solvent may be present in an appropriate amount for a desirable viscosity. For example, the solvent may be present in such an amount that the concentration of solids including the positive electrode active material, and optionally including the binder and the conductive material is 50 weight % to 95 weight %, preferably 70 weight % to 90 weight %.

The separator may include a porous polymer film commonly used as separators, for example, a porous polymer film made of a polyolefin-based polymer such as ethylene homopolymer, propylene homopolymer, ethylene/butene copolymer, ethylene/hexene copolymer and ethylene/methacrylate copolymer, used singly or in combination, or a general porous nonwoven fabric, for example, a nonwoven fabric made of high melting point glass fibers, polyethyleneterephthalate fibers, but is not limited thereto.

The electrolyte solution may include, for example, an organic electrolyte solution containing a lithium salt dissolved in a non-aqueous solvent or a polymer electrolyte solution.

The non-aqueous solvent that constitutes the organic electrolyte solution may include, for example, at least one of propylene carbonate, ethylene carbonate, butylene carbonate, benzonitrile, acetonitrile, tetrahydrofuran, 2-methyltetrahydrofuran, gamma butyrolactone, dioxolane, 4-methyldioxolane, N,N-dimethylformamide, dimethylacetamide, dimethylsulfoxide, dioxanes, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylbutyl carbonate, dipropyl carbonate, diisopropyl carbonate, dibutyl carbonate, diethyleneglycol and dimethylether, and known solutions for lithium secondary batteries, and in particular, the non-aqueous solvent may be preferably a combination of one of propylene carbonate, ethylene carbonate and butyl carbonate with one of dimethyl carbonate, methylethyl carbonate and diethyl carbonate.

The lithium salt may include, without limitation, those commonly used in electrolyte solutions for lithium secondary batteries, and for example, the cation may include $Li^+$, and the anion may include at least one of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. These lithium salts may be used singly or in combination if necessary.

The polymer electrolyte may include, for example, the organic electrolyte solution and (co)polymer that swells well in the organic electrolyte solution such as polyethylene oxide, polypropylene oxide, polyacetonitrile, polyvinylidene fluoride, polymethacrylate, polymethylmethacrylate.

The secondary battery according to the present disclosure has high energy density, high output and improved safety and stability, and may be preferably used, especially, in a medium- and large-sized battery module. Accordingly, the present disclosure further provides a medium- and large-sized battery module including the secondary battery as a unit cell.

The medium- and large-sized battery module may be preferably used as a power source of a device requiring high output and high capacity such as electric vehicles, hybrid electric vehicles and energy storage systems.

Meanwhile, the present disclosure relates to a negative electrode for a lithium secondary battery, and a variety of methods known in the technical field pertaining to the present disclosure may be used to manufacture the negative electrode for a lithium secondary battery according to the present disclosure and a lithium secondary battery comprising the same.

Hereinafter, the embodiments of the present disclosure will be described in detail to help the understanding of the present disclosure. However, the embodiments according to the present disclosure may be modified in many other forms, and it should not be interpreted that the scope of the present disclosure is limited to the following embodiments. The embodiments of the present disclosure are provided to explain the present disclosure fully to those having ordinary skill in the technical field pertaining to the present disclosure.

Example 1

Manufacture of Spheroidized Natural Graphite

First, a raw graphite ore was processed into small particles by mechanical treatment. Strong base solution treatment and strong acid solution treatment were performed at high temperature to remove impurities. After washing and drying at high temperature, mesh sieving was performed to mine platy natural graphite. To turn the platy natural graphite into a spherical shape, primary grinding and secondary grinding, i.e., a mechanical process was performed. Subsequently, after acid treatment, washing and drying, purification was performed to obtain high purity spherical natural graphite. Defects occurred to the surface of the obtained spherical natural graphite during mechanical pulverization and milling, and a chemical reactive group was formed after strong base/strong acid cleaning. During spheroidization, defects occurred in the natural graphite due to the mechanical process. Carbon coating was performed by solid phase coating of pitch (softening temperature of about 130° C.) on the defective high purity solid phase natural graphite surface by a dry method and carbonization in an inert gas atmosphere at about 1200° C. for about 24 hours, followed by disintegration, sieving and de-ironing, to obtain spheroidized natural graphite having D50 of about 16 μm and circularity of 0.90. The actual carbon ratio after carbon coating was about 3 weight %.

Manufacture of Negative Electrode

The negative electrode active material prepared as above, styrene-butadiene rubber (SBR) (Zeon) as a binder, carboxymethyl cellulose (Daicel, Daicel 2200) as a thickening agent and carbon black (Imerys, Super C-65) as a conductive material were prepared at a weight ratio of 96.6:1.3:1.1:1.0 and dispersed in water to prepare a negative electrode mixture slurry, the negative electrode mixture slurry was coated on two surfaces of a copper foil and dried to obtain a preliminary negative electrode having a negative electrode active material layer before pressing. Subsequently, the negative electrode having the negative electrode active material layer on two surfaces of the copper foil (the final negative electrode having the negative electrode active material layer formed by pressing) was manufactured from the preliminary negative electrode having the negative electrode active material layer before pressing using a tandem press (THANK-METAL, a mini precision roll press) at the temperature of 25° C. In this instance, pressing was performed with the adjusted gap of the tandem press between 30 and 65 to obtain a target porosity of the negative electrode active material layer. The density of the negative electrode active material layer of the negative electrode obtained by pressing was about 1.57 g/cc, the loading amount of the negative electrode active material was 3.6 mAh/cm², the porosity of the negative electrode active material layer was 28%, and the thickness of the negative electrode active material layer was 80 μm.

Additionally, the BET specific surface area of the negative electrode active material layer before pressing (BET specific surface area of the negative electrode active material layer of the preliminary negative electrode) was 2.5 m²/g, and the BET specific surface area after pressing (BET specific surface area of the negative electrode active material layer of the finally obtained negative electrode) was 3.5 m²/g. Additionally, the total pore volume of the negative electrode active material layer before pressing was $25.4 \times 10^{-3}$ cm³/g, and the total pore volume after pressing was $33.9 \times 10^{-3}$ cm³/g. The degree of orientation of the obtained negative electrode after pressing was $I_{004}/I_{110}$ of about 16.

Manufacture of Lithium Secondary Battery

LiCoO₂ (Umicore, XD2Oa) as a positive electrode active material, styrene-butadiene rubber (KUREHA, KF9706) as a binder, denka black (Denka, FX35) as a conductive material and an additive (ZEON, BM74 OH) were prepared at a weight ratio of 97.68:1.2:1.0:0.12 and dispersed in N-methyl pyrrolidone to prepare a positive electrode mixture slurry, and the positive electrode mixture slurry was coated on two surfaces of an aluminum foil, followed by drying and pressing, to manufacture a positive electrode.

A coin full cell type lithium secondary battery was manufactured by placing a polyethylene-based film separator (W-scope, WL20C) as a separator between the manufactured positive and negative electrodes as above, and preparing an electrolyte solution including an organic solvent of ethylene carbonate/ethyl methyl carbonate at a 2:8 weight ratio, a 1M $LiPF_6$ electrolyte salt and 0.5 weight % of a vinylene carbonate additive.

Example 2

A negative electrode and a lithium secondary battery including the negative electrode were manufactured using the same spheroidized natural graphite as example 1, except that less swellable natural graphite having reduced inner pores was used and the actual carbon ratio after performing carbon coating on the natural graphite was 4.5 weight %.

In this instance, the BET specific surface area of the negative electrode active material layer using the obtained spheroidized natural graphite before pressing was 2.5 m²/g, and the BET specific surface area after pressing was 3.6 m²/g. Additionally, the total pore volume of the negative electrode active material layer before pressing was $26 \times 10^{-3}$ cm³/g, and the total pore volume after pressing was $35 \times 10^{-3}$ cm³/g.

The degree of orientation of the obtained negative electrode after pressing was $I_{004}/I_{110}$ of about 22.

Example 3

A negative electrode and a lithium secondary battery including the negative electrode were manufactured using the same spheroidized natural graphite as example 1, except that less swellable natural graphite having reduced inner pores was used and the actual carbon ratio after performing carbon coating on the natural graphite was 5.5 weight %.

In this instance, the BET specific surface area of the negative electrode active material layer using the obtained spheroidized natural graphite before pressing was 2.5 m²/g, and the BET specific surface area after pressing was 3.4 m²/g. Additionally, the total pore volume of the negative electrode active material layer before pressing was $25 \times 10^{-3}$ cm³/g, and the total pore volume after pressing was $32.8 \times 10^{-3}$ cm³/g.

The degree of orientation of the obtained negative electrode after pressing was $I_{004}/I_{110}$ of about 18.

Comparative Example 1

First, a raw graphite ore is processed into small particles by mechanical treatment. Strong base solution treatment and strong acid solution treatment were performed at high temperature to remove impurities. After washing and drying at high temperature, mesh sieving was performed to mine platy natural graphite. To turn the platy natural graphite into a spherical shape, primary grinding and secondary grinding, i.e., a mechanical process was performed. Subsequently, after acid treatment, washing and drying, purification was performed to obtain high purity spherical natural graphite. Defects occurred to the surface of the obtained spherical natural graphite during mechanical pulverization and milling, and a chemical reactive group was formed after strong base/strong acid cleaning. During spheroidization, defects occurred in the natural graphite due to the mechanical process. By this reason, carbon coating was performed by carbonizing pitch on the high purity solid phase natural graphite surface in an inert gas atmosphere at about 1200° C. for about 24 hours, followed by disintegration, sieving and de-ironing, to obtain spheroidized natural graphite having D50 of about 16 μm and circularity of 0.90. The actual carbon ratio after carbon coating was approximately 3 weight %.

A negative electrode active material layer was formed using the spheroidized natural graphite, such that the BET specific surface area of the negative electrode active material layer before pressing was 2.3 m$^2$/g, the BET specific surface area after pressing was 3.9 m$^2$/g, the total pore volume of the negative electrode active material layer before pressing was 26.2×10$^{-3}$ cm$^3$/g, and the total pore volume after pressing was 37.2×10$^{-3}$ cm$^3$/g. Except for the foregoing, a lithium secondary battery was manufactured by the same method as example 1. The degree of orientation of the obtained negative electrode after pressing was $I_{004}/I_{110}$ of about 40.

Comparative Example 2

Spheroidized natural graphite is manufactured by the same method as example 1 except the high purity solid phase natural graphite surface was only coated with crude petroleum, not pitch, such that the actual carbon ratio was about 3%.

A negative electrode active material layer was formed using the spheroidized natural graphite, such that the BET specific surface area of the negative electrode active material layer before pressing was 2.3 m$^2$/g, the BET specific surface area after pressing was 3.9 m$^2$/g, the total pore volume before pressing was 26.2×10$^{-3}$ cm$^3$/g, and the total pore volume after pressing was 37×10$^{-3}$ cm$^3$/g. Except for the foregoing, a lithium secondary battery was manufactured by the same method as example 1. The degree of orientation of the obtained negative electrode after pressing was $I_{004}/I_{110}$ of about 39.

Comparative Example 3

Spheroidized natural graphite was obtained by the same method as example 1 except that the high purity solid phase natural graphite surface was only coated with pitch such that the actual carbon ratio was 4.0 weight %. The degree of orientation of the obtained negative electrode after pressing was $I_{004}/I_{110}$ of about 39.

A negative electrode active material layer was formed using the spheroidized natural graphite, such that the BET specific surface area of the negative electrode active material layer before pressing was 2.3 m$^2$/g, the BET specific surface area after pressing was 3.8 m$^2$/g, the total pore volume of the negative electrode active material layer before pressing was 26×10$^{-3}$ cm$^3$/g, and the total pore volume after pressing was 36×10$^{-3}$ cm$^3$/g. Except for the foregoing, a lithium secondary battery was manufactured by the same method as example 1.

Comparative Example 4

Spheroidized natural graphite was obtained by the same method as example 1 except that the high purity solid phase natural graphite surface was only coated with pitch such that the actual carbon ratio was 5.5 weight %. The degree of orientation of the obtained negative electrode after pressing was $I_{004}/I_{110}$ of about 39.

A negative electrode active material layer was formed using the spheroidized natural graphite, such that the BET specific surface area of the negative electrode active material layer before pressing was 2.3 m$^2$/g, the BET specific surface area after pressing was 3.7 m$^2$/g, the total pore volume of the negative electrode active material layer before pressing was 26.6×10$^{-3}$ cm$^3$/g, and the total pore volume after pressing was 36.6×10$^{-3}$ cm$^3$/g. Except for the foregoing, a lithium secondary battery was manufactured by the same method as example 1.

Evaluation Method

Evaluation of BET Specific Surface Area and Total Pore Volume of Negative Electrode Active Material Layer The negative electrodes of examples 1 to 3 and comparative examples 1 to 4 were completely dried, and the negative electrode active material layer was cut to the size of 8 mm×8 mm to prepare 30 samples. The sampled negative electrode active material layer was put into a standard sample cell (glass) and dried in a vacuum condition at 130° C. for 2 hours. To measure in a liquid nitrogen container of 77 K, the liquid nitrogen container was filled with liquid nitrogen. The standard cell was cooled down, and to measure in the liquid nitrogen condition, the standard sample cell was fixed to a measurement instrument (BEL Japan, BELSORP-mino II). Subsequently, the program of the measurement instrument worked to measure the BET specific surface area through adsorption/desorption on the sampled negative electrode active material layer surface in the nitrogen gas environment.

When measuring the BET specific surface area, the total pore volume was measured together.

Evaluation of Degree of Orientation of Negative Electrode

The degree of orientation of the negative electrodes of examples 1 to 3 and comparative examples 1 to 4 was measured using Cu-Kα radiation by using an X-ray diffraction analyzer (X-ray diffraction (XRD), Model: Bruker D4 Endeavor), and numerical corrections were performed through Topas3 fitting program.

A ratio of the measured 004 peak and 110 peak was expressed as 1004/1110 indicating the degree of orientation of the negative electrode.

Evaluation Method of Negative Electrode Thickness Swelling Ratio in Charge/Discharge Cycles The negative electrode thickness swelling ratio in charge/discharge cycles of the lithium secondary batteries of examples 1 to 3 and comparative examples 1 to 4 was evaluated. The negative electrode thickness swelling ratio was a value obtained by dividing a swollen negative electrode thickness when charged by a reference negative electrode thickness, wherein the reference negative electrode thickness was the measured thickness of the negative electrode after pressing, and the swollen negative electrode thickness was the measured thickness of the charged negative electrode during charging/discharging. In this instance, charge/discharge cycles were done in the following condition, and the results were shown in the following Table 1.

Charge range: SOC 0~95@±25° C.
   1st cycle: 0.1 C, 0.1 C CC/CV mode 4.35V charging 0.005 C cut, 0.1 C CC mode discharging 2.75V
   2nd cycle: 0.2 C, CC/CV mode 4.35V charging 0.005 C cut, 0.2 C CC mode discharging 2.75V
   3rd to 30th cycles: 0.5 C, CC/CV mode 4.35V charging 0.005 C cut, 0.5 C CC mode discharging 2.75V

TABLE 1

|  | Example 1 | Example 2 | Example 3 | Comparative example 1 | Comparative example 2 | Comparative example 3 | Comparative example 4 |
|---|---|---|---|---|---|---|---|
| BET specific surface area of negative electrode active material layer before pressing (m$^2$/g) | 2.5 | 2.5 | 2.5 | 2.3 | 2.3 | 2.3 | 2.3 |
| BET specific surface area of negative electrode active material layer after pressing (m$^2$/g) | 3.5 | 3.6 | 3.4 | 3.9 | 3.9 | 3.8 | 3.7 |
| Difference in BET specific surface area of negative electrode active material layer before and after pressing (m$^2$/g) | 1.0 | 1.1 | 0.9 | 1.6 | 1.6 | 1.5 | 1.4 |
| Total pore volume of negative electrode active material layer before pressing (cm$^3$/g) | $25.4 \times 10^{-3}$ | $26 \times 10^{-3}$ | $25 \times 10^{-3}$ | $26.2 \times 10^{-3}$ | $26.2 \times 10^{-3}$ | $26 \times 10^{-3}$ | $26.6 \times 10^{-3}$ |
| Total pore volume of negative electrode active material layer after pressing (cm$^3$/g) | $33.9 \times 10^{-3}$ | $35 \times 10^{-3}$ | $32.8 \times 10^{-3}$ | $37.2 \times 10^{-3}$ | $37 \times 10^{-3}$ | $36 \times 10^{-3}$ | $36.6 \times 10^{-3}$ |
| Difference in total pore volume of negative electrode active material layer before and after pressing (cm$^3$/g) | $8.5 \times 10^{-3}$ | $9 \times 10^{-3}$ | $7.8 \times 10^{-3}$ | $11 \times 10^{-3}$ | $10.8 \times 10^{-3}$ | $10 \times 10^{-3}$ | $10 \times 10^{-3}$ |
| I004/I110 degree of orientation of negative electrode | 16 | 22 | 18 | 40 | 39 | 39 | 39 |
| Negative electrode thickness swelling ratio (@ 30 cycles) | 25 | 26 | 25 | 33 | 32 | 30 | 29 |

It can be seen from the foregoing that the negative electrodes of examples 1 to 3 according to the present disclosure had a much lower negative electrode thickness swelling ratio than the negative electrodes of comparative examples 1 to 4.

While the embodiments of the present disclosure have been hereinabove described, one having ordinary skill in the technical field pertaining to the present disclosure will understand that the present disclosure may be carried out in other forms without departing from the technical aspects or essential features of the present disclosure.

Therefore, it should be understood that the disclosed embodiments are provided by way of illustration, but not intended to limit the present disclosure. The scope of the present disclosure is defined by the appended claims rather than the detailed description, and it should be interpreted that the scope of the present disclosure covers all modifications or changes derived from the meaning and scope of the appended claims and the equivalent concept.

What is claimed is:

1. A negative electrode for a lithium secondary battery, comprising:
    a negative electrode active material layer,
    wherein the negative electrode active material layer is formed by steps of coating a negative electrode mixture slurry comprising spheroidized natural graphite particles as a negative electrode active material on at least one surface of a negative electrode current collector, followed by drying and pressing the negative electrode mixture slurry on the at least one surface of the negative electrode current collector,
    wherein the spheroidized natural graphite particles comprise a plurality of pores, wherein carbonized pitch is present in the plurality of pores,
    wherein the carbonized pitch is solid phase coated by dry method,
    wherein the negative electrode active material layer has a Brunauer-Emmett-Teller (BET) specific surface area of the negative electrode active material layer after the pressing that is larger than a BET specific surface area of the negative electrode active material layer before the pressing, wherein a difference in the BET specific surface area before and after pressing ranges from 0.9 m$^2$/g to 1.2 m$^2$/g,
    wherein the BET specific surface area of the negative electrode active material layer after pressing ranges from 3.3 m$^2$/g to 3.8 m$^2$/g, and
    wherein the negative electrode has degree of orientation of an I$_{004}$/I$_{110}$ value of 14 to 23 after pressing.

2. The negative electrode for a lithium secondary battery according to claim 1, wherein the negative electrode active material layer after pressing has the BET specific surface area that is larger than the BET specific surface area before pressing, wherein the difference in the BET specific surface area before and after the pressing ranges from 0.9 m$^2$/g to 1.1 m$^2$/g.

3. The negative electrode for a lithium secondary battery according to claim 1, wherein the negative electrode active material consists of the spheroidized natural graphite including the plurality of pores into which the pitch inserted.

4. The negative electrode for a lithium secondary battery according to claim 1, wherein the negative electrode active material layer after pressing has a total pore volume that is larger than a total pore volume of the negative electrode active material layer before pressing, wherein a difference in the total pore volume before and after pressing ranges from $8 \times 10^{-3}$ cm$^3$/g to $9 \times 10^{-3}$ cm$^3$/g.

5. The negative electrode for a lithium secondary battery according to claim 1, wherein the negative electrode has the degree of orientation of an I$_{004}$/I$_{110}$ value of 16 to 22 after pressing.

6. A lithium secondary battery comprising the negative electrode for a lithium secondary battery defined in claim 1.

7. A method for manufacturing the negative electrode for a lithium secondary battery defined in claim 1, the method comprising:
    (S1) coating spheroidized natural graphite with pitch by a solid phase, dry method;
    (S2) forming a negative electrode active material layer comprising the coated spheroidized natural graphite as a negative electrode active material on at least one surface of an electrode current collector; and (S3) pressing the negative electrode active material layer obtained in (S2) by a press roll at a temperature ranging between 23° C. to 25° C. to obtain the negative electrode active material layer, wherein a Brunauer-Emmett-Teller (BET) specific surface area of the negative electrode active material layer after pressing is larger than the BET specific surface area of the negative electrode active material layer before pressing, a difference in the BET specific surface area before and after pressing ranges from 0.9 m$^2$/g to 1.2 m$^2$/g, and the BET specific surface area of the negative electrode active material layer after pressing is 3.3 m$^2$/g to 3.8 m$^2$/g.

8. The method for manufacturing according to claim 7, wherein in (S2), the BET specific surface area of the negative electrode active material layer before pressing is 2.4 m$^2$/g to 2.6 m$^2$/g.

9. The method for manufacturing according to claim 7, wherein in (S2), the negative electrode active material layer before pressing has a total pore volume ranging from $20 \times 10^{-3}$ cm$^3$/g to $30 \times 10^{-3}$ cm$^3$/g.

10. The method for manufacturing according to claim 7, wherein (S3) comprises a step of pressing the negative electrode active material layer obtained in (S2) by the press roll at the temperature ranging between 23 to 25° C. to obtain the negative electrode active material layer wherein a total pore volume of the negative electrode active material layer after pressing is larger than a total pore volume of the negative electrode active material layer before pressing, and a difference in the total pore volume before and after pressing ranges from $8 \times 10^{-3}$ cm$^3$/g to $9 \times 10^{-3}$ cm$^3$/g.

\* \* \* \* \*